United States Patent [19]

Vandenberg

[11] 4,270,522
[45] Jun. 2, 1981

[54] SOLAR HEAT COLLECTION AND TRANSFER SYSTEM

[76] Inventor: Leonard B. Vandenberg, 710 Sanders Ave., Scotia, N.Y. 12302

[21] Appl. No.: 953,130

[22] Filed: Oct. 19, 1978

[51] Int. Cl.³ .................................................. F24J 3/02
[52] U.S. Cl. .................................... 126/434; 126/437
[58] Field of Search ............... 126/433, 434, 428, 437, 126/442, 444, 901, 436

[56] References Cited

U.S. PATENT DOCUMENTS

| | | | |
|---|---|---|---|
| 1,705,988 | 3/1929 | Maxwell | 126/433 |
| 1,971,242 | 8/1934 | Wheeler | 126/434 |
| 4,173,994 | 11/1979 | Hiser | 126/435 |

FOREIGN PATENT DOCUMENTS

2380502 10/1978 France ................................. 126/433

*Primary Examiner*—Samuel Scott
*Assistant Examiner*—G. Anderson
*Attorney, Agent, or Firm*—Robert J. Bird

[57] ABSTRACT

A fluid system for controlling fluid temperatures and transferring heat from a solar energy collector to a point-of-need heat exchanger, remote from the collector, from which heat is discharged for use. Heat is collected by the fluid in the solar collector, which fluid flows by natural circulation into an accumulator, connected in a continuous heat accumulation loop with the collector. A self-energized forced-convection heat transfer loop leads from the accumulator to the lower discharge heat exchanger and back to the solar collector.

The fluid system blanket pressure, i.e. the pressure at the high point of the system, is maintained at a level such that the fluid vaporizes in the temperature range of the solar collector. Vapor energy is extracted from the blanket vapor in the accumulator to energize an injector pump in the forced-convection heat transfer loop to motivate the heated fluid through the loop from the accumulator to the point-of-need heat exchanger for practical use.

2 Claims, 7 Drawing Figures

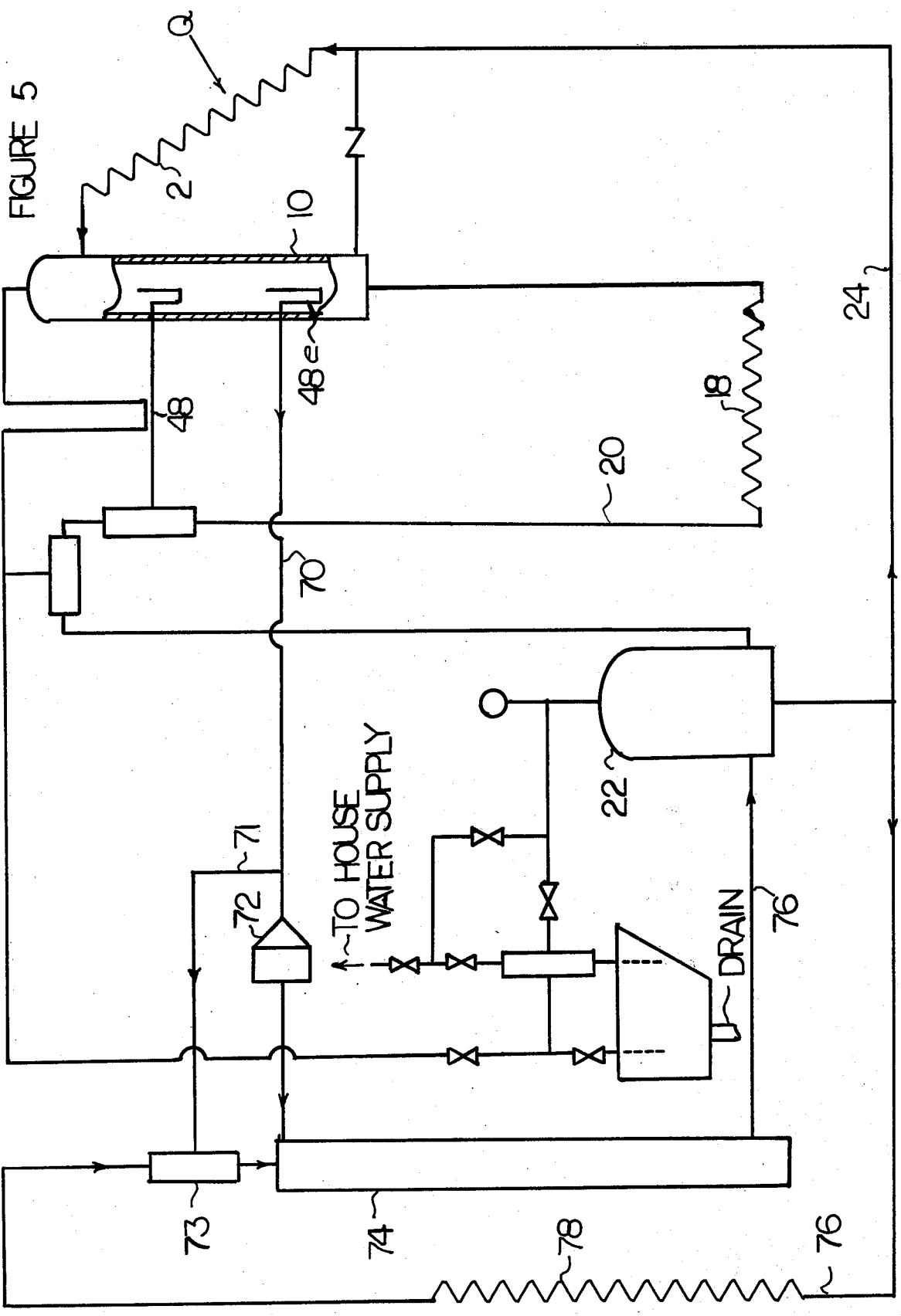

SOLAR HEAT COLLECTION AND TRANSFER SYSTEM

BACKGROUND AND SUMMARY OF THE INVENTION

This invention relates to controlled solar heat collection and transfer. More specifically the subject matter is a fluid system for collecting heat as by a rooftop solar energy collector and transferring the heat to a point of discharge that can be at a lower elevation as for example a space heater or the like located in a lower part of the building.

In typical solar energy collection systems, the energy collector is positioned above the discharge heat exchanger or heat sink. This requires the use of external power, pumps, and controls to circulate the heated fluid and thereby to transfer heat to the lower discharge heat exchanger.

The present invention is a distinct and novel fluid system for transferring heat from a heat source or collector to a heat sink or discharger remote from the heat source, without the use of external energy. Heat is collected by fluid in the collector which fluid flows by natural circulation into an accumulator, connected in a continuous heat accumulation loop with the collector. A continuous heat transfer loop leads from the accumulator to the lower heat sink and back to the heat source. The fluid system is maintained at a pressure such that the system high point is at fluid saturation conditions so that the fluid vaporizes in the temperature range of the source or collector. Some of the resulting vapor is expanded in an injector pump to produce energy for moving the heat transfer fluid around the heat transfer loop.

The details, operation, and benefits of the present invention will now be described more specifically with reference to the accompanying drawing.

DRAWING

FIG. 5 is a schematic diagram of a modified system according to this invention.

DESCRIPTION

Figure 1:
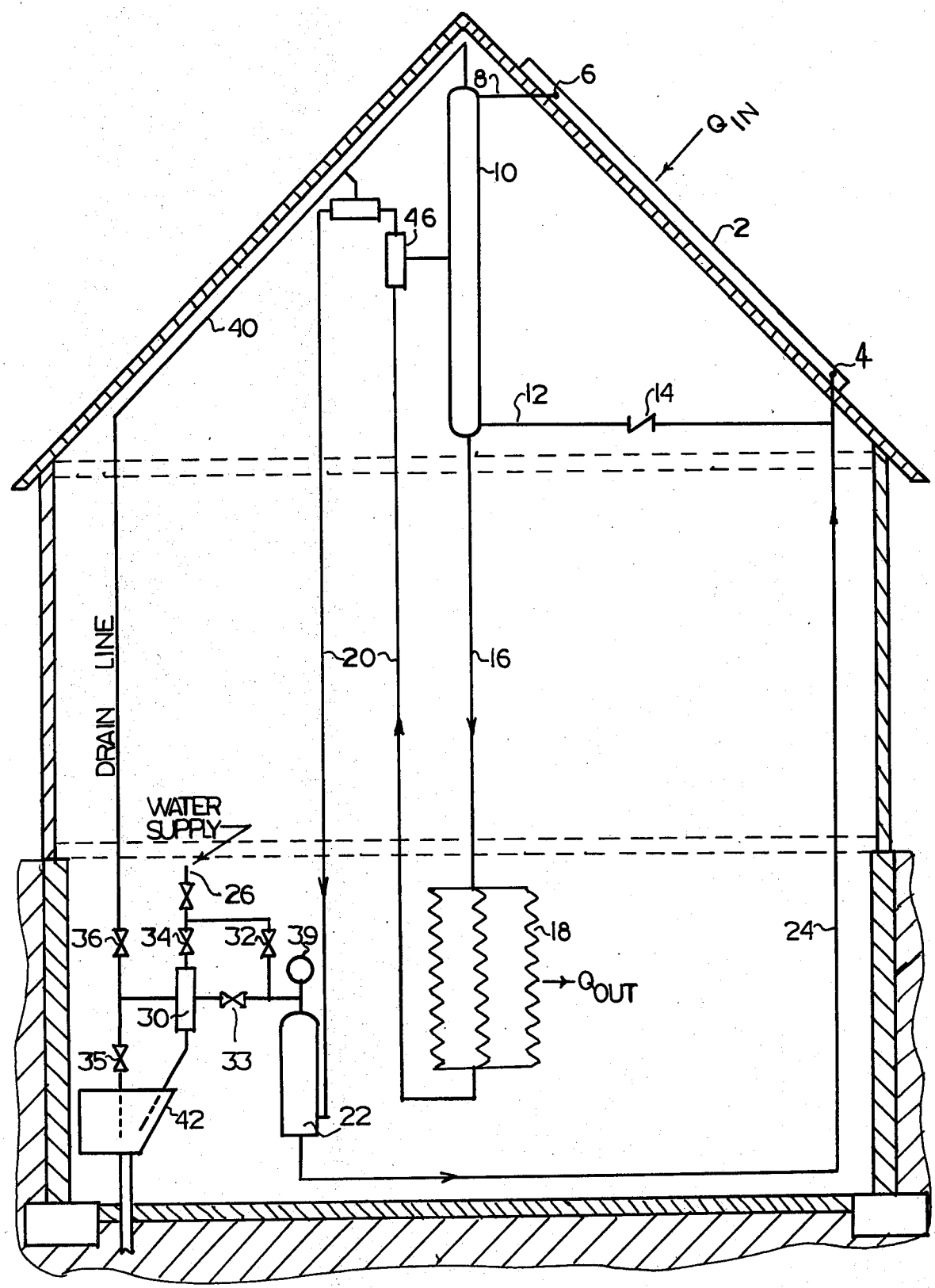
FIG. 1 is a schematic diagram of the system of this invention, represented in its environment in a house or other building.

In FIG. 1, the system of this invention is shown in relation to a building in which it serves as a source of useful heat, Q out, as indicated in the basement. A solar energy collector 2, the heat source of the system, is mounted on the roof of the building in an advantageous position to receive sunlight. While the ultimate source of heat to this system is the sun, the term "heat source" is also used herein in its thermodynamic sense, indicating the hot body within the thermodynamic cycle. Collector 2 is a conduit for a fluid heat transfer medium, such as water, and includes an inlet 4 for cold water and an outlet 6 for heated water and vapor. A collector discharge line 8 leads from collector outlet 6 to the upper portion of an accumulator 10, which is among other things a tank to hold a volume of water and vapor. Accumulator 10 is located in an upper part of the building at about the same elevation as is the solar collector. Accumulator 10 connects at its lower portion to a circulation line 12 which in turn leads to collector inlet 4. Circulation line 12 includes a check valve 14 which permits flow only from the accumulator 10 to collector inlet 4. Collector 2, discharge line 8, accumulator 10, and circulation line 12 leading back to the collector together form a continuous heat accumulation loop for the natural circulation of water and heat from the collector to the accumulator.

A heat transfer loop leads from the lower portion of the accumulator through a hot fluid line 16 to a discharge heat exchanger 18, thence through a cold fluid line 20 to an expansion or pressure tank 22 and on through a return line 24 to the collector inlet 4. Discharge heat exchanger 18 is located in the lower part of the building. The heat transfer loop thus leads from the accumulator to the collector inlet and may be considered as in parallel with line 12 of the heat accumulation loop.

Figure 2:
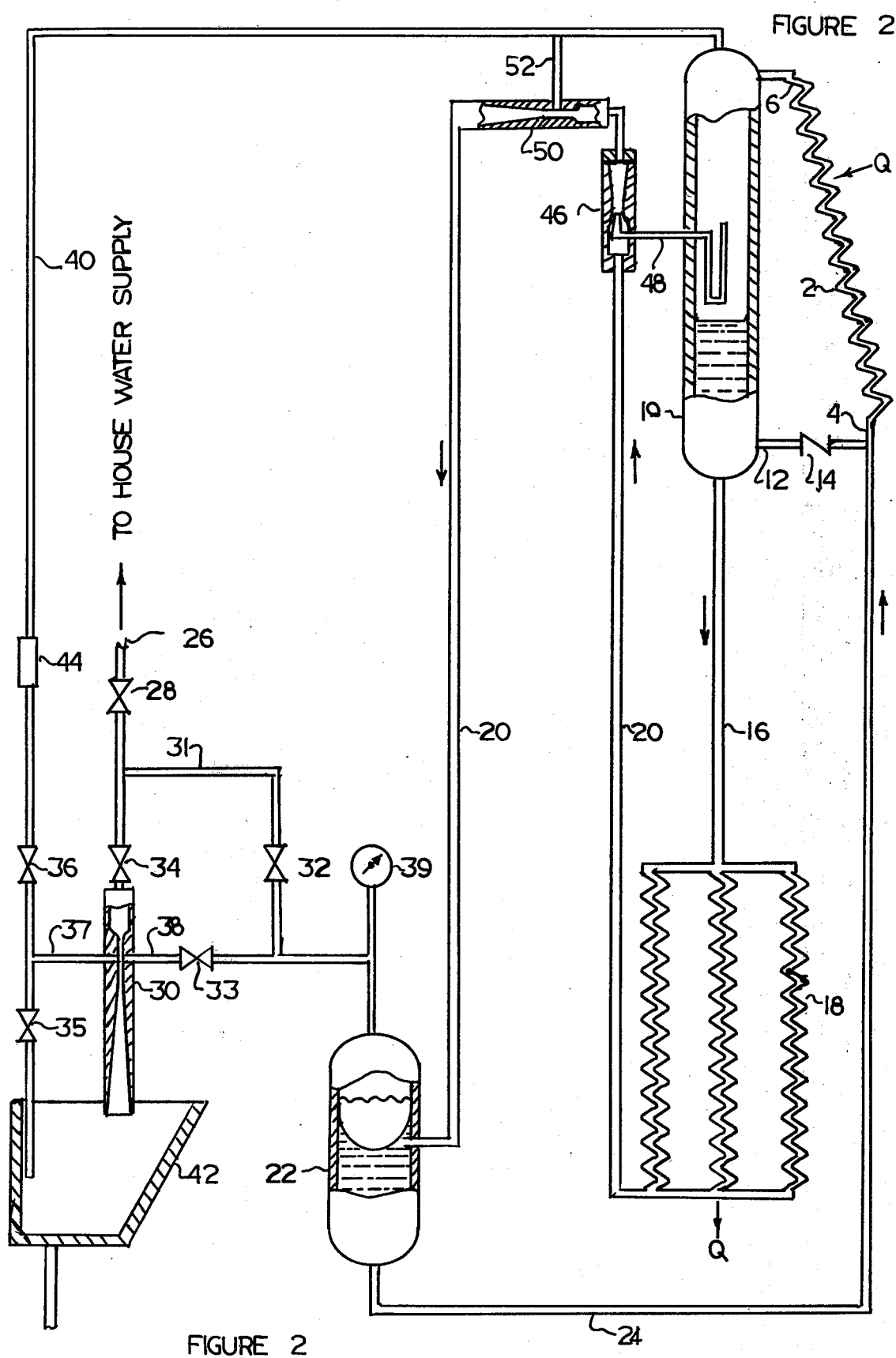
FIG. 2 is a more detailed schematic diagram of the fluid system of FIG. 1.

Referring to FIG. 2, a source 26 of heat transfer fluid, and if the fluid is water this can be simply a house water system, is connected to the present system for filling the same and keeping it filled and at the right pressure. Source 26 connects to the system through an isolation valve 28 from which the source line leads through parallel lines and shut-off valves 32 and 34 to, respectively, the expansion tank 22 and an aspirator 30. An aspirator suction line 38, including an isolation valve 33, connects to the system with feed line 31 at the expansion tank 22. A vacuum-pressure gage 39 is also connected to the system at the expansion tank. A vent-drain line 40 leads from the highest point in the system, above the collector and accumulator, to a drain 42. Drain line 40 includes a sight glass 44, a shut-off valve 36, and a second shut-off or drain valve 35 downstream of an aspirator suction tap 37.

An injector pump 46 is located in the heat transfer loop to force-circulate the heat transfer fluid around the loop in the direction indicated by the arrows. A motive steam line 48 leads from the upper portion of the accumulator 10 to the injector pump 46, providing the driving energy by which pump 46 circulates water in line 20. An eductor 50 is also connected in line 20 such that the primary fluid flow in line 20 into the eductor is motive fluid for the eductor and the eductor acts to impress a vacuum or suction in a suction line 52 which leads to the vent-drain line 40.

Figure 3:
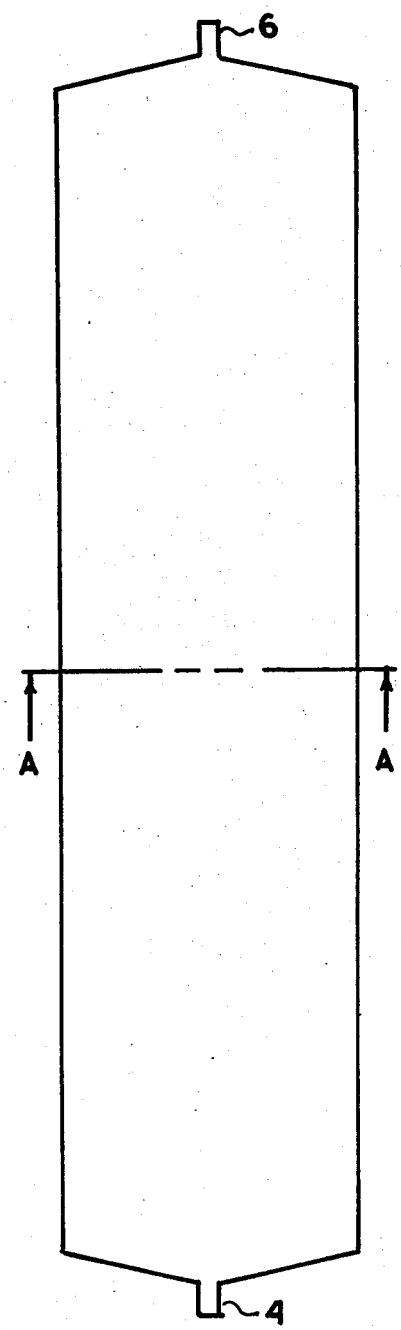
FIG. 3 is a plan view of a solar energy collector according to this invention.
Figure 3A:
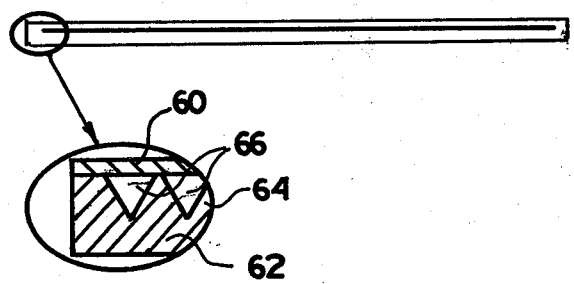
FIGS. 3a and 3b are sectional views, taken along line A—A of FIG. 3, of alternative configurations of the solar collector of FIG. 3.
Figure 3B:
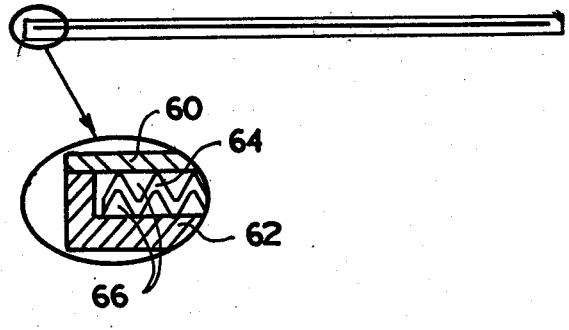

Reference is now made to FIGS. 3, 3a, and 3b. FIG. 3 shows the general configuration of a solar collector 2, viewed as from above and to the right of the house in FIG. 1. Inlet 4 is at a lower elevation than outlet 6. The solar collector 2 includes a front panel 60 and a back panel 62. Front panel 60 is preferably of a plastic material, transmissive of solar radiation, and faces the sun. Back panel 62 forms the base of the collector unit. Back panel 62 supports, or includes as an integral part thereof, a corrugated or grooved absorber sheet 64 which defines a plurality of fluid flow channels 66. In both FIGS. 3a and 3b the absorber sheet 64 is of an elastomeric material, resilient so as to be deformable under pressure.

Referring back to FIG. 2, the procedure for filling the system with water will now be described. If flexible solar collectors and other plastic components are used, it is necessary to avoid internal pressure and therefore to vacuum fill the system. This is accomplished by first filling the expansion tank 22 with valves 33 and 34 closed and valves 28, 32, 35, and 36 open. Water is admitted to the expansion tank until the gage 39 indicates a pressure which is positive but less than that required to raise water to the level of the collector inlet 4, i.e. to support a column of water from the cellar floor to the lower roof level in the illustration of FIG. 1. While water is rising filling the expansion tank and some of the system piping, air is vented through line 40 and drain valves 35, 36. Next, fill valve 32 and drain valves 35, 36 are closed and aspirator valve 34 opened. In this condition, only valves 28 and 34 are open, admitting motive water into the aspirator 30 and impressing a vacuum in suction lines 37 and 38. Now drain valve 36 is opened and air drawn through it and line 40 into the aspirator and drain 42. The resulting subatmospheric pressure in line 40 (the high point or blanket pressure in the system) draws water higher into the system, the accumulator, and the solar collector until the system is filled at a subatmospheric pressure, and water instead of air drains through line 40 as can be determined in the sight glass 44. At this point, the system is full and valve 36 closed. Vacuum can be increased or adjusted if desired by continuing to operate the aspirator (valves 28 and 34 open) and opening suction valve 33 to draw trapped air from the expansion tank. Coordinating the operation of suction valve 33 with the pressure gage reading, the desired initial system pressure can be reached.

This vacuum fill procedure avoids damaging the solar collector if the same is of the flexible low pressure type described in connection with FIG. 3. If the collector is of some other type which is made to contain ordinary water system pressures, then the valves can simply be manipulated to fill and vent the system until water appears in the sight glass, and the desired vacuum drawn, by reducing the pressure of the air trapped in the expansion tank, with the aspirator and suction valve 33.

The combination of external atmospheric pressure and subatmospheric pressure within the system causes the compression of the solar collector front and back panels and, if used, the absorber sheet 64 between them, to better define the flow channels 66.

Figure 4:
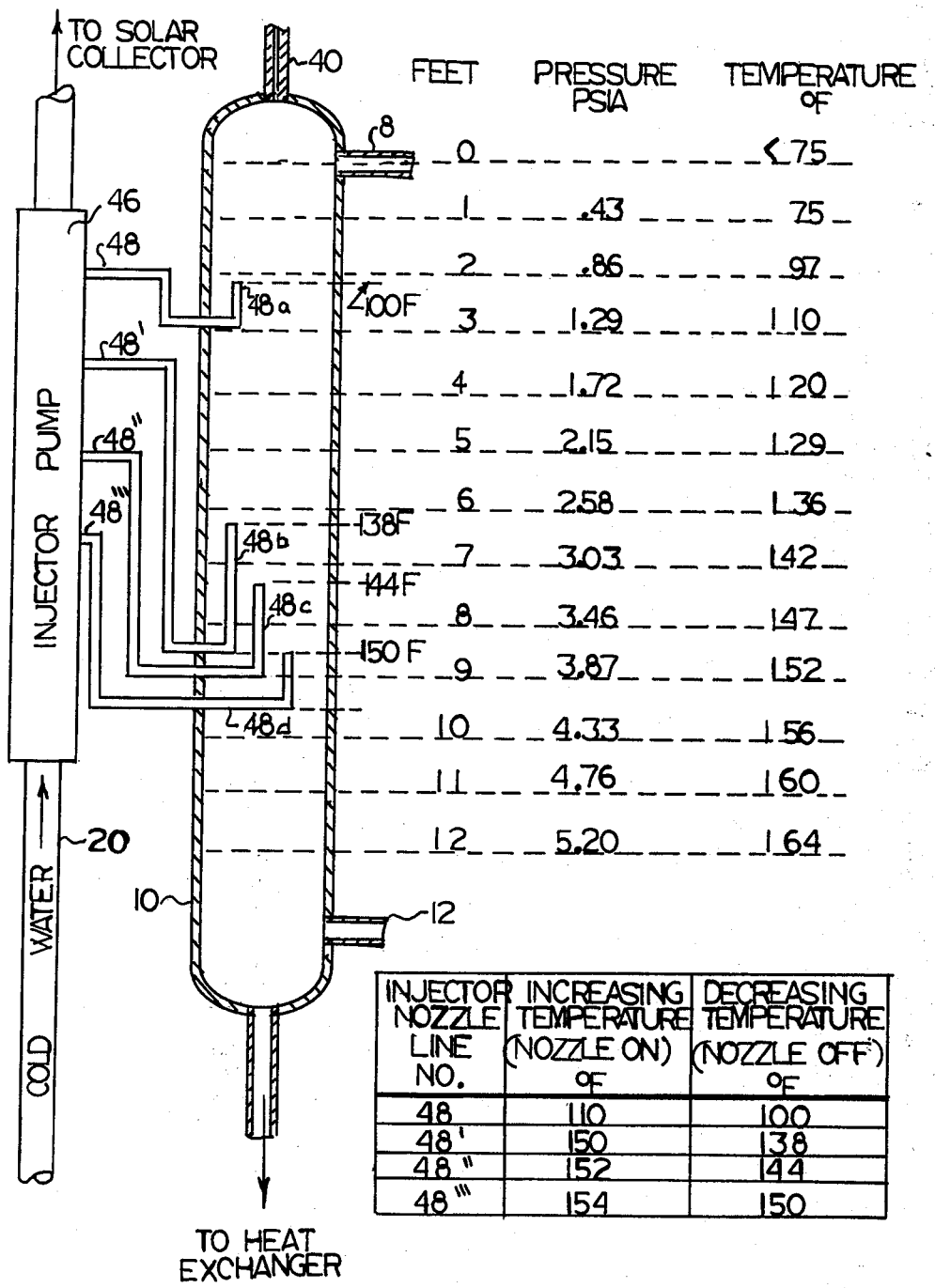
FIG. 4 is a more detailed schematic diagram of an accumulator and the thermal regulation feature of the system.

Referring now to FIG. 4, the accumulator 10 and associated injector pump 46 are shown in more detail. The accumulator 10 functions to:

a. receive heated water and steam from the collector 2,
b. supply steam to the injector pump 46, and
c. control fluid flow and temperatures in the system.

FIG. 4 represents an internal arrangement of the accumulator. The horizontal dashed lines represent fluid conditions, correlating liquid level with temperature and pressure. The top line, "0" steam volume or liquid level, "0" psia, and 75° F. represents an initial or reference condition. When the sun heats the water in the collector, natural convection causes water to flow from the collector into the top of the accumulator. Cold water displaced from the bottom of the accumulator flows through line 12 and check valve 14 into the collector 2. The water being continually heated in this way eventually vaporizes, developing a certain head of steam in the top of the accumulator. As temperature increases, to 75° F., 97° F., and 110° F., vapor pressure increases respectively to 0.43, 0.86, and 1.29 psia, and the steam column to 1, 2, and 3 feet as indicated in FIG. 4.

Accumulator 10 supplies motive steam to the injector pump 46 through motive steam line 48 which, within the accumulator, includes a U-tube 48a having its open end at the 100° F., 0.96 psia level and its low point at the 110° F., 1.29 psia level.

As heating continues in the collector-accumulator natural convection system, and the accumulator water level drops, a pressure imbalance grows between accumulator steam and the water in cold line 20. The steam pressure in the accumulator increases to greater than 1.29 psia with a corresponding steam volume to below the 3 feet 1.29 psia level of the U-tube 48a. This pressure is now sufficient to drive the water up out of the U-tube 48a, followed by steam into the injector pump 46. The injection of steam into injector pump 46 motivates the flow of water in the cold fluid line 20 and thereby in the entire heat transfer loop 16, 18, 20 and so on continually as heat is added to the system at the collector.

Referring back to FIG. 2, water in loop 20 passes through the eductor 50 which provides suction in suction line 52 to entrain air and other non-condensible gases from the high point of the system, thereby ensuring the pumping action of the injector pump which requires the entering motivating fluid to be condensible at the temperature of the fluid in the cold loop, 20. Any such gas as collects at the system high point is thus removed and carried to the expansion tank. Line 20 enters the expansion tank tangentially so that water flow into the tank establishes a vortex action in the tank to enhance the separation of liquid and gas. Gas collected in the expansion tank is periodically removed by operation of the aspirator 30 and valve 33.

Solar collectors must operate in a relatively narrow range of temperatures in order to be efficient. For instance, if temperatures are higher than necessary for achieving the desired heat transfer to the heat sink, heat loss from the collector will be excessive. On the other hand the outlet temperature of the collector cannot be less than the temperature of the heat sink because heat would then be withdrawn from the sink to heat the collector.

Since the incident solar radiation is highly variable it is necessary to continually regulate the flow of coolant through the collector in order to control the temperature and achieve maximal efficiency. Regulation of flow is provided by additional U-tubes located in the accumulator 10. These additional U-tubes are 48b, 48c, and 48d, similar to 48a but successively lower in the accumulator and each leading to the injector 46 through steam lines 48', 48'', and 48''' respectively. In the system illustrated, U-tube 48b has its open end at the 138° F. level and low point at the 150° F. level. U-tube 48c is open at 144° F. and bottomed at 152° F. U-tube 48d is open at 150° F. and bottomed at 154° F. These U-tubes function in the same way as does U-tube 48a but in addition provide means for controlling collector temperature. For instance assume that the incident collector solar radiation is initially constant in intensity. Furthermore that the steam produced motivates the injector pump so that the system arrives at a state of equilibrium with the water surface at the 5 foot level in the accumulator, FIG. 4. At these conditions the injector pump receives steam from U-tube 48a at a pressure of 2.15 psia which according to the assumption is sufficient for providing forced circulation through the system to maintain the equilibrium condition. If it is now assumed that there is a slight increase in incident solar radiation, the temperature and enthalpy of the vapor in the accumulator will increase. The additional available energy in the vapor will cause the injector to produce higher forced convection flows to retard the collector temperature rise. Since the vapor pressure increases with temperature, the water level in the accumulator will drop to a new level which for example is assumed to be at 6 feet, FIG. 4. However if a large increase in solar radiation occurs, the vapor pressure in the accumulator will cause the water to recede below the 6 foot level. If the accumulator temperature exceeds 150° F. for the particular system shown on FIG. 4, a second steam supply becomes available for driving the injector pump and re-establishing equilibrium. Additional tubes can be included depending on system requirements. U-tubes 48c and 48d satisfy the need for additional pump power for the particular system shown on FIG. 4.

The above description relates to conditions of increasing solar heat flux. The system responds similarly to reduce flow when heat fluxes decrease. If the sun is shining brightly the steam generation is at maximum and the water level in the accumulator drops. At indicated points on FIG. 4, with increasing temperature successive U-tubes become operative to carry steam to the injector pump. The increasing pressure, while the water level is descending, and then the additional U-tube each time one is uncovered, provide gradually greater steam flow to the injector and correspondingly greater circulation in the heat transfer loop 20. The net effect is that the system is self-regulating to provide a relatively uniform temperature output at the discharge heat exchanger 18 in response to a wide range of solar influx. In other words, higher rate of heat transfer at the collector results in correspondingly higher rate of heat transfer at the discharge heat exchanger, the temperature there tending to be stable.

The tabulation in FIG. 4 indicates temperatures at which steam tubes go into operation with increasing temperature, or out of operation with decreasing temperature. This data is specific to a particular accumulator design represented. These particulars as to U-tube location and cut-in, cut-out temperatures are variable to suit the requirements of a particular system.

FIG. 5 shows an extension of this invention to power generation. Consider this as an addition to the system described above with FIGS. 1 and 2. If heat is not withdrawn from the discharge heat exchanger 18, steam will continue to develop and the water level in the accumulator will drop until yet another U-tube 48e is uncovered. Tube 48e leads through a steam line 70 to a heat engine 72, thence to a direct contact steam condenser 74. A motive steam line 71 taps from line 70 and leads to an injector pump 73. A condenser coolant loop 76 includes the injector pump 73 and the condenser 74 where steam and water directly contact to condense the steam. Coolant loop 76 leads into and out of the expansion tank 22 and also through a condensate cooler 78 where the water is cooled prior to entry in the direct contact condenser 74. The heat engine 72 in this system will operate between the steam pressure in the accumulator and that in the condenser. In this arrangement, simply stated, the heat sink or heat discharger is the heat engine 72.

An extension of the power generation system of FIG. 5 is its use also as a water distillation plant. In this mode of operation the condenser system is disconnected from the collector system and the collector is supplied from an independent source such as a source of brackish or saline water. The heat engine condensate is then a source of distilled water.

It is considered that the present invention provides a novel fluid system to extract useful heat from solar radiation, without external power input, by operating the system at pressures at which the fluid (water) boils to provide the requisite motive power. System pressure can be controlled by establishing a given pressure level in the expansion tank. The essential things are that the fluid pressure in the collector be such that saturation conditions exist and that structural limitations of the collector are not exceeded by the fluid pressure.

The foregoing specification describes the concept of this invention and the best mode presently contemplated for practicing the same. The scope of the invention is limited only by the purview of the following claims.

What is claimed is:

1. A system for collecting and transferring heat in a fluid heat transfer medium from a heat source to a remote point of heat discharge, including:
   a solar energy collector to add heat to said heat transfer medium, said collector including front and back panels defining a cavity therebetween, an absorber sheet disposed in said cavity and defining a plurality of flow channels for said heat transfer medium, said absorber sheet being of an elastomeric material so as to be deformable under external pressure on said panels to enhance the separation of said flow channels, and inlet and outlet fluid passages for the flow of said heat transfer medium into and out of said collector,
   an accumulator to hold a quantity of said heat transfer medium and including a hot fluid inlet passage and a cold fluid outlet passage,
   said collector and said accumulator being operatively connected to form a continuous heat accumulation loop for natural circulation of said heat transfer medium from said collector to said accumulator and from said accumulator to said collector,
   heat discharge means to discharge heat from said heat transfer medium, said discharge means defining a passage for the flow of said heat transfer medium therethrough and including a hot fluid inlet passage and a cold fluid outlet passage,
   said collector, said accumulator, and said heat discharge means being operatively connected to form a continuous heat transfer loop for circulation of said heat transfer medium from said collector successively to said accumulator, said heat discharge means, and back to said collector,
   an injector pump operatively disposed in said heat transfer loop to circulate said heat transfer medium around said heat transfer loop against the gravitational tendency of said medium, said injector pump further operatively connected by a vapor line to said heat accumulation loop to extract motive vapor therefrom, and
   pressure control means to establish the pressure within said system to bring the vaporization temperature of said heat transfer medium within the temperature range of said collector.

2. A system as defined in claim 1 in which said pressure control means includes a drain to remove a quantity of said heat transfer medium from a relatively low point in said system, thereby to draw down the fluid pressure to desired subatmospheric levels at said collector.

* * * * *